3,346,473
PRODUCTION OF OLEFIN OXIDES AND CARBOXYLIC ACIDS

Robert Stevenson Coffey and Herbert George Lawley, Norton-on-Tees, England, assignors to Imperial Chemical Industries Limited, London, England, a corporation of Great Britain
No Drawing. Continuation of application Ser. No. 180,016, Mar. 15, 1962. This application Dec. 28, 1964, Ser. No. 421,583
Claims priority, application Great Britain, Mar. 17, 1961, 9,812/61
11 Claims. (Cl. 204—158)

This application is a continuation of our application Ser. No. 180,016, filed Mar. 15, 1962 and now abandoned.

This invention relates to the production of oxygen-containing organic compounds, particularly olefine oxides and organic acids.

According to the present invention, there is provided a process for the production of oxygen-containing organic compounds including olefine oxides and carboxylic acids which comprises the step of contacting a liquid mixture containing an aldehyde having two or more carbon atoms and an olefinic compound in which the double bond is in the terminal position and which contains three or more carbon atoms at a temperature in the range of 40° to 150° C. with a gas containing molecular oxygen.

A wide range of aldehydes may be used in the process of the present invention. Acetaldehyde is particularly suitable. Although higher straight-chain aliphatic aldehydes, for example propionaldehyde or n-butyraldehyde, may be employed, these are less suitable because in their presence the occurrence of side reactions is increased and in consequence there is a decrease in the amount produced of carboxylic acid corresponding to the aldehyde and, to a lesser extent, a decrease in the amount produced of olefine oxide corresponding to the olefine. Branched chain aliphatic aldehydes, for example iso-butyraldehyde, may be used but they are less suitable than straight chain aldehydes because they are also more susceptible to side reactions. The use of a branched or unbranched higher aliphatic aldehyde, that is one containing three or more carbon atoms, leads in general to the formation of a mixture of acidic products comprising the expected carboxylic acid together with smaller amounts of carboxylic acids of lower molecular weight, and sometimes to a mixture of neutral products comprising lower aldehydes and ketones, all of these lower acids and neutral products resulting primarily from oxidative degradation of the aldehyde starting material. Although, in general, the use of lower aldehydes is preferable, it will be understood that the process may be carried out, although in an inferior manner, using higher aldehydes, and this mode of operation may sometimes be adopted, for example when a higher aldehyde is particularly readily accessible. The aldehyde to be used should also be selected to make the separation of products as easy as possible. For example, in the production of 1:2-epoxypropane by the co-oxidation of propylene, the use of aldehydes other than acetaldehyde may lead to difficulties in purification. Thus, if n-butyraldehyde is used in the process, the products obtained contain some propionaldehyde and acetone, and the separation of these from 1:2-epoxypropane may be difficult. Aromatic aldehydes, such as benzaldehyde, are also suitable for use in the present process. Benzaldehyde has the advantage over aliphatic aldehydes having a similar number of carbon atoms that it is less liable to oxidative degradation.

A wide range of aliphatic mono-olefinic compounds in which the double bond is in the terminal position and which contain three or more carbon atoms is suitable for use in the process of the present invention. For example, it is possible to use propylene and higher straight-chain olefines containing up to fourteen carbon atoms and above. Thus, good results may be obtained using n-octene-1. The presence of an alkyl group on the 2-carbon atom leads to a faster rate of production of the olefine oxide and a higher yield based on the aldehyde employed. Thus, although as disclosed above n-octene-1 is suitable for use in the present process, even better results are obtained using 2-methylheptene-1.

It is also possible to employ olefinic compounds containing other functional groups such as, for instance, hydroxy, alkoxy, keto, carboxyl, ester, aryl and halide, in the process of the present invention. Thus, it is possible by the present process to convert allyl alcohol to a mixture of its oxide and one or more mono-esters of glycerol and these compounds are valuable intermediates in the production of glycerol. The use of di-olefines, such as butadiene, to give mono and/or di-oxides, is also possible.

It is desirable to carry out the process of the present invention in the presence of an initiator which may be, for example, ultra-violet light; hydrogen peroxide; alkyl hydroperoxides and dialkyl peroxides having formulae R—O—O—H and R—O—O—R respectively, where R is an alkyl group such as tertiary butyl; diacyl peroxides such as diacetyl peroxide or cyclohexylsulphonyl acetyl peroxide; dialkyl peroxy dicarbonates such as di-isopropyl peroxy dicarbonate; peroxy esters such as tertiary butyl perbenzoate; and salts of metals of variable valency such as copper, manganese, nickel and cobalt. While inorganic salts may be employed, organic salts such as acetates, stearates, naphthenates, oleates, benzoates, acetonylacetates and acetoacetates are preferable because these are in general soluble under the reaction conditions employed and in consequence they are more effective. Additionally, it is sometimes preferable to employ in conjunction a metal-containing initiator and an organic initiator, both being selected from the range of compounds listed above.

If desired, the present process may be carried out using a diluent, which is relatively inert to oxidation under the reaction conditions employed. Diluents which are particularly suitable are acetone, methyl acetate, ethyl acetate and acetic acid. It is possible to use other organic compounds, notably higher ketones, esters and carboxylic acids than those mentioned, but, in general, compounds containing methyl groups rather than —CH$_2$— or >CH— groups are preferable because they are less susceptible to oxidation. An exception ot this principle is that it is sometimes preferable to use as diluent the same carboxylic acid as that being produced in the process, even though this may contain —CH$_2$— or CH groups. This is because the problem of separating the diluent from the acid produced does not then arise, and this advantage may outweigh partial degradation of the acid.

The process of the present invention is preferably carried out at a temperature of 60 to 90° C. The reaction may be carried out at atmospheric pressure or at any suitable elevated pressure, the pressure being high enough to maintain the reaction mixture in the liquid phase and also to maintain a sufficiently high concentration of dissolved oxygen for the reaction to proceed at a convenient speed. The gas containing molecular oxygen may be oxygen itself, air, mixtures of nitrogen and oxygen, and oxygen together with any suitable diluent such as carbon dioxide or the olefine which is to be converted to its oxide. Thus, when propylene is to be oxidised, oxygen and propylene preferably in admixture with an inert diluent such as nitrogen may be fed together to the reaction zone; additionally, this mixture may also contain some propane, because it is generally more economic to use a propane-propylene mixture rather than propylene itself. As far as possible, the composition of gas mixtures used or produced in the present process should lie outside the explosive limits.

In general, it is desirable to operate at as high a molar ratio of olefine to aldehyde as is consistent with a satisfactory space-time yield. When operating batchwise, the total quantities of olefine and aldehyde to take part in the reaction are brought together and then a gas containing molecular oxygen is passed through the system. In this case, the molar ratio of olefine to aldehyde should be at least 5:1 and, if the olefine is a straight-chain, relatively involatile compound such as n-octene-1, the molar ratio should be 10:1 or greater. When using relatively volatile olefines, such as propylene, even higher ratios are desirable to off-set olefine carried over in the exit gas. In this latter case, good results are more likely to be obtained by using relatively high pressures and a relatively high oxygen concentration in the gas fed.

The reaction may also be carried out in a semi-continuous manner, that is the whole of the olefinic compound is fed initially and aldehyde is added continuously. In this case, good yields may be obtained with lower overall olefine:aldehyde molar ratios than those hitherto stated to be preferable. This is because, with the continuous addition of aldehyde, the stationary aldehyde concentration is low throughout and hence the olefine:aldehyde ratio at any one time is relatively high. For instance, a 70% yield of propylene oxide on aldehyde may be obtained using an overall propylene:aldehyde molar ratio of 8:1, and much lower molar ratios are suitable for less volatile olefines.

The reaction may also be carried out in a truly continuous manner, that is both olefine and aldehyde may be fed continuously to the reaction zone. The most suitable olefine:aldehyde molar ratio will then depend on the manner of operation. If the olefine and aldehyde are fed to the reactor separately but at closely adjacent points or as a combined stream at a single point it will be desirable for the molar ratio of olefine:aldehyde to be greater than 5:1 and preferably greater than 10:1. On the other hand, if the olefine is fed continuously into one end of the reactor and aldehyde is introduced continuously at a succession of points along the reactor, then a lower total olefine:aldehyde molar feed ratio may be employed. In general, lower olefine:aldehyde ratios may be used for olefines having a substituted rather than an unsubstituted 2-carbon atom.

It is desirable for the amount of molecular oxygen fed to be relatively great compared with the quantity of aldehyde employed. In this way, undesirable side reactions are decreased and the maximum space-time yield of desired compounds is obtained. In the continuous manner of operation, for example, at least two moles of oxygen should be fed per mole of aldehyde.

In carrying out the present process, the materials of construction of the apparatus are important. Thus, porcelain, enamel and resins are suitable for use. The metal sold under the registered trade mark "Staybrite" is particularly suitable and it is also possible to use surfaces of tin and aluminium. It is advantageous for the reaction vessel to have as great a volume:surface area ratio as possible.

When, for example, the present process is carried out using an organic initiator, it is desirable for stabilizers such as chelating agents, for instance ethylene diamine tetra-acetic acid and 8-hydroxy-quinoline, pyrophosphates and stannates to be incorporated in the reaction system.

The lower olefine oxides produced by the present process may be used, for example, in the production of polymers while the higher olefine oxides may be converted, for example, by hydrogenation, into alcohols, notably primary alcohols and these are suitable for use in the manufacture of plasticisers or detergents.

EXAMPLE 1

This example shows the advantage of having present an aldehyde during the oxidation of a hydrocarbon.

The method employed was to place the hydrocarbon in a glass flask having a volume of 500 mls., to raise this to the desired temperature and to pass gaseous oxygen through it at the rate of 15 litres per hour by means of a cruciform stirrer.

In an initial experiment, the oxidation of n-octene-1 (0.5 mole; 56 grams) containing cobalt stearate (0.19 grams) was attempted. The reaction temperature was 75–78° C. and operation was carried out for 140 minutes. At the end of this time, the reaction product was analyzed. It consisted almost entirely of unchanged n-octene-1 and it contained only 0.002 equivalent of acid and 0.2 gram of olefine oxide.

The process was repeated except that during the first 135 minutes of reaction, n-butyraldehyde (0.25 mole; 18.0 grams) was added dropwise. The reaction product contained 0.185 equivalent of acid, this corresponding to 74% of theory, based on aldehyde employed. The reaction product was neutralised with sodium hydroxide, extracted with ether and the ethereal extract was fractionally distilled. In this way there were obtained unchanged aldehyde (0.3 grams), unchanged n-octene-1 (39.7 grams), 1:2-epoxyoctane (14.8 grams) and other neutral oxidation products (10.0 grams), these consisting mainly of saturated ketones together with smaller amounts of alcohols and esters. The major acidic product obtained by acidification of the neutralised product was n-butyric acid, but traces of formic, acetic and proprionic acids were present. The conversions of aldehyde and olefine were thus 98% and 29% respectively while the epoxide yield, based on reacted aldehyde and octene respectively was 47% and 79%. The ratio by weight of neutral liquid by-products to 1:2-epoxyoctane was 0.68:1.

EXAMPLE 2

Example 1 was repeated using n-butyraldehyde, the reaction being carried out at four different temperatures. The results are summarised in Table 1 below.

TABLE 1

| Temp., °C. | Aldehyde conversion (percent) | n-Octene-1 conversion (percent) | Epoxide yield (percent) | | Acid yield on aldehyde reacted (percent) | Neutral liquid by products (g. per g. epoxide) |
| --- | --- | --- | --- | --- | --- | --- |
| | | | On n-butyraldehyde reacted | On n-octene-1 reacted | | |
| 34–37 | 98 | 25 | 23 | 46 | 55 | 0.64 |
| 54–57 | 96 | 18 | 28 | 74 | 51 | 0.73 |
| 74–78 | 98 | 29 | 47 | 79 | 75 | 0.68 |
| 97–100 | 97 | 51 | 42 | 40 | 63 | 1.21 |

This table shows that reaction temperatures of 34–100° C. are feasible, the best results being obtained at a temperature of 74 to 78° C.

EXAMPLE 3

This example shows that a much smaller amount of cobalt stearate may be employed.

The experiment carried out in Example 1 using n-butyraldehyde was repeated except that only 0.01 gram of cobalt stearate was employed. Only 0.146 equivalent of acid (58% of theory) was produced. On working up the crude product, n-octene-1 (38.6 grams), 1:2-epoxyoctane (11.3 grams) and other liquid oxidation products (7.0 grams) were isolated. No unchanged aldehyde was detected. Thus, the conversions of aldehyde and olefine were 100% and 31% respectively, the yields of epoxide, based on reacted aldehyde and reacted olefine, were 35% and 57% respectively and the weight ratio neutral liquid by-products to epoxide was 0.62:1.

EXAMPLE 4

This example illustrates that the present process can be carried out in a batchwise manner. The reaction was carried out as in Example 1 except that the n-butyraldehyde, n-octene-1 and cobalt stearate were all present initially at the beginning of the reaction. The crude reaction product contained only 0.111 equivalent of acid. From the crude product, unchanged aldehyde (0.9 gram), unchanged n-octene-1 (42.2 grams), 1:2-epoxyoctane (9.7 grams) and neutral liquid by-products (8.1 grams) were obtained. The conversions of aldehyde and olefine were 95% and 24% respectively. The epoxide yields based on the quantities of aldehyde and olefine reacted were thus 32% and 63% respectively, the acid yield based on aldehyde reacted was 47% and the weight ratio of neutral liquid by-products to epoxide was 0.83:1. Compared with the corresponding semi-continuous experiment described in Example 1 using aldehyde, the epoxide and acid yields obtained in this batchwise method of operation are inferior and there is a greater formation of liquid neutral by-products.

EXAMPLE 5

This example illustrates the use of cyclohexylsulphonyl acetyl peroxide as initiator.

The process described in Example 1 using n-butyraldehyde was repeated except that cyclohexylsulphonyl acetyl peroxide (0.1 gram) was used instead of cobalt stearate, and that the passage of oxygen was continued for a further 30 minutes after the addition of the aldehyde had been completed. The crude product contained 0.072 equivalent of acid and from it unchanged n-octene-1 (51.9 grams), unchanged aldehyde (4.0 grams), 1:2-epoxyoctane (4.8 grams) and other neutral liquid oxidation products (0.7 gram) were obtained. Thus, the conversions of aldehyde and n-octene-1 were 78% and 7% respectively, while the yield of acid on aldehyde reacted was 37%. The yields of epoxide on reacted aldehyde and on reacted olefine were 19% and 98% respectively, and the weight ratio of other neutral by-products to epoxide was 0.15:1.

EXAMPLE 6

This example illustrates the use of ultra-violet light as an initiator.

The experiment described in Example 1 using n-butyraldehyde was repeated exactly as described except that no cobalt stearate was employed and that the reaction mixture was irradiated with a mercury vapour lamp. The crude reaction product contained 0.122 equivalent of acid, comprising mainly n-butyric acid together with traces of formic, acetic and propionic acids. On working up the crude reaction product, unchanged aldehyde (1.3 grams), unchanged olefine (44.4 grams), 1:2-epoxyoctane (8.7 grams) and other neutral products (5.0 grams) were obtained. Thus, the conversions of aldehyde and olefine were 93% and 21% respectively. The epoxide yields based on reacted aldehyde and reacted olefine were 29% and 66% respectively, while the acid yield based on reacted aldehyde was 63%. The weight ratio of neutral by-products to epoxide was 0.58:1.

On carrying out this experiment in the absense of added n-butyraldehyde, the product was substantially unchanged n-octene-1 containing less than 0.001 equivalent of acid and no epoxide.

EXAMPLE 7

This example shows that the reactor in which the present process is carried out may be made of aluminium or the metal sold under the registered trademark "Staybrite" but that mild steel is unsatisfactory.

The reaction was carried out exactly as described in Example 1 using n-butyraldehyde, 0.5 gram of filings of the metal under test being present in the reaction mixture. The results are given in Table II.

TABLE II

| Metal Tested | Dissolved metal in reaction product (p.p.m. by wt.) | Aldehyde conversion (percent) | n-Octene-1 conversion (percent) | Epoxide yield (percent) | | Yield of acid (percent on aldehyde reacted) | Neutral liquid by-products (g. per g. epoxide) |
|---|---|---|---|---|---|---|---|
| | | | | On aldehyde reacted | On olefine reacted | | |
| Aluminium | Al, 32 | 96 | 37 | 38 | 49 | 72 | 0.60 |
| "Stay-brite" | Fe, 7 | 98 | 34 | 37 | 53 | 73 | 0.62 |
| | Fe, 7 | 97 | 37 | 37 | 48 | 70 | 0.56 |
| Mild Steel | Fe, 750 | 97 | 34 | 26 | 37 | 67 | 0.70 |

Mild steel is clearly undesirable because it lowers the epoxide yield, gives a higher neutral liquid by-products epoxide ratio and gives a much higher metal content in the reaction product and is therefore relatively seriously corroded. Aluminium and the metal sold under the registered trademark "Staybrite" have no significant effect on the reaction, but of the two the aluminium is dissolved to a greater extent.

EXAMPLE 8

This example illustrates operation under pressure using a diluted oxygen-containing gas.

An aluminium-lined pressure oxidation vessel was charged with a mixture of n-octene-1 (560 grams; 5.0 moles), n-butyraldehyde (144 grams; 2.0 moles) and cobalt stearate (2.0 grams). The liquid was maintained at a temperature of 60–70° C. under a total pressure of 300 lbs. per square inch gauge. A gas consisting of 6% of oxygen and 94% of nitrogen by volume was passed at a rate of 850 litres per hour through the mixture for 90 minutes. The crude reaction product contained 1.01 equivalent of acid. From the mixture, unchanged olefine (2.87 moles), unchanged aldehyde (0.24 mole), 1:2-epoxyoctane (0.28 mole) and neutral liquid by-products (95.4 grams) were isolated. Thus, the olefine and aldehyde conversions were 43% and 88% respectively. The epoxide yields based on reacted olefine and reacted aldehyde respectively were 13% and 16% while the yield of acid was 58%. The weight ratio of neutral liquid by-products to epoxide was 2.65:1.

Although an olefine oxide is produced by this mode of operation it will be noted that results are inferior to those obtained with a semi-continuous operation using undiluted oxygen.

EXAMPLE 9

This example illustrates the oxidation of a branched-chain aliphatic olefine in the present process.

In a blank experiment carried out under the conditions used in Example 1, an attempt was made to oxidise 2:4:4-trimethylpentene-1 in the presence of cobalt stearate but in the absence of an aldehyde. The reaction product consisted essentially of unchanged hydrocarbon and contained only 0.0003 equivalent of acid and less than 0.2 gram of epoxide.

In a second experiment, n-butyraldehyde (0.25 mole; 18.0 grams) and 2:4:4-trimethylpentene-1 (0.5 mole; 56.0 grams) were oxidised as described in Example 1 in the presence of cobalt stearate (0.19 gram) at a temperature of 78–80° C., the duration of the reaction being three hours. The crude product, which contained only 0.055 equivalent of acid, yielded unchanged olefine (30.4 grams) unchanged aldehyde (2.5 grams), 1:2-epoxy-2:4:4-trimethylpentane (17.0 grams) and other products (10.0 grams). Thus, the conversions of olefine and aldehyde were 46% and 86% respectively, and the epoxide yields, based on reacted olefine and reacted aldehyde respectively, were 58% and 61%. The yield of acid on aldehyde reacted was 26% and the weight ratio neutral liquid by-products to epoxide was 0.59:1.

EXAMPLE 10

This example illustrates the co-oxidation of acetaldehyde and propylene and also the effect of varying the olefine-aldehyde molar ratio.

Propylene, acetaldehyde, ethyl acetate and cobalt naphthenate were charged to an aluminium-lined reactor in the quantities given below in Table IIIA.

TABLE IIIA

| Run No. | Propylene (moles) | Acetaldehyde (moles) | Ethyl acetate (grams) | Cobalt naphthenate (grams) |
|---|---|---|---|---|
| 1 | 9.29 | 5.45 | 575 | 2.0 |
| 2 | 9.40 | 2.73 | 710 | 2.0 |
| 3 | 9.05 | 1.36 | 782 | 2.0 |

The liquid was raised to a temperature of 54–59° C. at a pressure of 400 lbs. per square inch gauge. A mixture of 6% oxygen and 94% by volume nitrogen was passed through at a rate of 850 litres per hour for fifteen minutes. In the three runs, the results given in Table IIIB were obtained.

TABLE IIIB

| Run No. | Acetaldehyde conversion (percent) | Propylene oxide yield (percent on acetaldehyde converted) | Yield of acid (percent on acetaldehyde converted) | Neutral liquid by-products (g. per g. propylene oxide) |
|---|---|---|---|---|
| 1 | 47 | 4.5 | 36 | 12.7 |
| 2 | 66 | 13.0 | 41 | 4.1 |
| 3 | 75 | 24 | 53 | 1.3 |

This shows the advantages obtained in a batchwise process of using a high olefine:aldehyde molar ratio.

EXAMPLE 11

This example shows that the present process can be operated in the absence of an initiator, provided that the temperature is sufficiently high.

Propylene (16.66 moles), acetaldehyde (2.0 moles) and ethyl acetate (500 grams) were charged to an aluminium-lined reactor maintained at a temperature of 40° C. and at a pressure of 400 lbs. per square inch. A stream containing by volume 6% oxygen and 94% nitrogen was passed through the solution at a rate of 850 litres per hour for 2.5 hours. This experiment was repeated at 55° C. and at 63° C., except that in these two experiments the reaction time was only two hours. The results are given in the Table IV below.

TABLE IV

| Temp., ° C. | Acetaldehyde conversion (percent) | Propylene oxide yield (percent on acetaldehyde converted) | Yield of acid (percent on acetaldehyde converted) | Neutral liquid by-products (g. per g. propylene oxide) |
|---|---|---|---|---|
| 40 | 44 | 1 | 30 | 40.8 |
| 55 | 56 | 6.5 | 41 | 6.0 |
| 63 | 76 | 28 | 59 | 0.9 |

EXAMPLE 12

This example shows that the co-oxidation of propylene and acetaldehyde is more satisfactory when carried out by a semi-continuous rather than the batchwise process as described in Examples 10 and 11.

An aluminium-lined reactor was charged with propylene (758 grams; 18.0 moles), ethyl acetate (500 grams) and cobalt naphthenate (2.0 grams). This liquid was maintained at a temperature of 65° C. and at a pressure of 400 lbs. per square inch gauge for 95 minutes, during which time acetaldehyde (88 grams; 2.0 moles) was injected continuously. Simultaneously a gas stream containing by volume 8% of oxygen and 92% by volume of nitrogen was passed through at a rate of 735 litres per hour, the gas flow being continued for ten minutes after the introduction of aldehyde was complete. From the product, acetaldehyde (0.48 mole), propylene oxide (1.09 mole), acid (1.208 equivalent; essentially acetic acid), unchanged ethyl acetate diluent and higher-boiling oxidation products were recovered. The conversion of aldehyde was 76%, the yield of propylene oxide based on reacted aldehyde was 71.5% and the yield of acid based on reacted aldehyde was 79.5%.

In this example, the high yield of propylene oxide based on reacted aldehyde should be noted and compared with the corresponding yield obtained by batchwise operation in Example 10. Additionally, this method of aldehyde addition results in a low stationary aldehyde concentration and this in turn decreases the amounts of carbon monoxide and carbon dioxide formed as by-products.

EXAMPLE 13

This example illustrates the co-oxidation of acetaldehyde and n-octene-1. It also shows the advantage of using a diluent such as ethyl acetate or acetone rather than operating in the absence of diluent.

(i) A mixture of acetaldehyde (11.0 grams; 0.25 mole) and n-octene-1 (28.0 grams; 0.25 mole) was added during two hours to a mixture of n-octene-1 (84.0 grams; 0.75 mole) and cobalt stearate (0.2 gram) contained in a glass reactor and maintained at 70–75° C. at atmospheric pressure. Gaseous oxygen was passed through at a rate of 15 litres per hour using a cruciform stirrer, the gas flow being continued for ten minutes after the aldehyde addition was complete.

(ii) A solution of acetaldehyde (0.25 mole) in ethyl acetate (28.7 grams) was added as described in (i) above to a solution of cobalt stearate (0.2 gram) in n-octene-1 (0.50 mole) and ethyl acetate (89.8 grams). The period of reaction, temperature and passage of oxygen were as described in paragraph (i).

(iii) The experiment described in (ii) was repeated except that the weights of acetone used for the acetaldehyde and n-octene-1 solutions were 25.0 grams and 78.2 grams respectively. Furthermore, the reaction temperature was only 56° C. and the duration of addition of the acetaldehyde solution was 100 minutes. The gas flow was continued for 210 minutes after acetaldehyde addition was complete.

The products were worked up in the usual manner and results are given in Table V below.

TABLE V

| Experiment | Acetaldehyde conversion (percent) | Epoxide yield (percent on acetaldehyde converted) | Acid yield (percent on acetaldehyde converted) | Neutral liquid by-products (g. per g. olefine oxide) |
|---|---|---|---|---|
| (i) | 57.3 | 17.5 | 46.0 | 1.47 |
| (ii) | 95.5 | 32.4 | 66.4 | 0.51 |
| (iii) | 80.0 | 24.3 | 65.5 | 0.61 |

These results clearly show the beneficial effect of the solvent on acetaldehyde conversion, yields of desired products and diminution of neutral liquid by-products.

EXAMPLE 14

In this example, the efficacy of various metal initiators is compared.

In all cases, acetaldehyde (0.25 mole) in ethyl acetate (25 mls.) was added over a period of 1 to 3 hours to a solution of the initiator to be tested (0.20 to 0.25 gram) in a mixture of n-octene-1 (0.50 mole) and ethyl acetate (25 mls.). The temperature was maintained in the range of 55–75° C., the pressure was atmospheric and gaseous oxygen was passed at a rate of 5 litres per hour through the solution during acetaldehyde addition and then for a period of 20 to 60 minutes. The products were analysed and the results are given in Table VI below.

TABLE VI

| Initiator | Reaction temp. (° C.) | Aldehyde conversion (percent) | Acid formed (equiv.) | Epoxide formed (mole) | Neutral liquid by-products (g. per g. epoxide) | Epoxide yield on acetaldehyde converted (percent) | Acid yield on acetaldehyde converted (percent) |
|---|---|---|---|---|---|---|---|
| Nil | 55–74 | 6 | 0.012 | 0.002 | 1.0 | 13 | 80 |
| Manganese naphthenate | 68–72 | 68 | 0.095 | 0.034 | 0.6 | 20 | 56 |
| Copper naphthenate | 68–74 | 72 | 0.083 | 0.043 | 1.1 | 24 | 46 |
| Nickel stearate | 68–75 | 72 | 0.095 | 0.043 | 0.8 | 24 | 53 |
| Vanadium naphthenate | 66–73 | 43 | 0.041 | 0.005 | 0.7 | 5 | 38 |
| Chromium stearate | 67–71 | 36 | 0.032 | 0.010 | 1.4 | 11 | 36 |
| Ferric stearate | 62–70 | 31 | 0.029 | 0.005 | 1.8 | 6 | 37 |

These results show that manganese, copper and nickel are good initiators, while vanadium, chromium and iron are much less efficient.

EXAMPLE 15

This example illustrates the use of two organic initiators in the co-oxidation of n-octene-1 and acetaldehyde. The procedure was as described in the previous example except that the initiators were dissolved in the aldehyde-ethyl acetate solution. The results obtained are summarised in the Table VII below.

TABLE VII

| Initiator | Weight employed (gm.) | Reaction Temp. (° C.) | Aldehyde conversion (percent) | Acid formed (equiv.) | Epoxide formed (mole) | Epoxide yield on acetaldehyde converted (percent) | Acid yield on acetaldehyde converted (percent) |
|---|---|---|---|---|---|---|---|
| Nil | | 55–74 | 6 | 0.012 | 0.002 | 13 | 80 |
| Di-isopropyl peroxy dicarbonate | 0.5 | 68–73 | 69 | 0.046 | 0.033 | 19 | 27 |
| Azo-bisisobutyronitrile | 5.0 | 63–71 | 34 | 0.057 | 0.021 | 25 | 67 |

EXAMPLE 16

This example shows the co-oxidation of acetaldehyde and isobutene.

A mixture of iso-butene (224 grams; 4.0 moles), ethyl acetate (440 grams) and cobalt naphthenate (2.0 grams) was charged to an aluminium-lined pressure vessel which was maintained at 80–85° C. under a total pressure of 400 lbs. per square inch gauge. Acetaldehyde (176 grams; 4.0 moles) was injected continuously over a period of 105 minutes and a stream containing by volume 10% oxygen and 90% nitrogen was passed through at a rate of 850 litres per hour. After the whole of the acetaldehyde had been added, the oxygen-nitrogen gas stream was continued for a further 15 minutes. Distillation of the reaction product gave unchanged iso-butene (1.74 moles), unchanged acetaldehyde (1.80 moles), iso-butene oxide (121.3 grams; 1.68 moles) and acetic acid (0.82 equivalent). The conversions of iso-butene and acetaldehyde were thus 56.5% and 55% respectively. The yields of iso-butene oxide, based on reacted olefine and reacted aldehyde respectively, were 74% and 76%, while the yield of acid, based on aldehyde converted, was 37%.

EXAMPLE 17

This example shows the use of an olefine containing an aromatic grouping, namely styrene.

n-Butyraldehyde (0.25 mole; 18.0 grams) was added gradually during 90 minutes to a mixture of styrene (0.5 mole; 52 grams), ethyl acetate (72 grams) and cobalt stearate (0.2 gram) contained in a glass flask and maintained at a temperature of 70–74° C. at atmospheric pressure. Gaseous oxygen was passed through at a rate of 15 litres per hour, the flow of gas being maintained for a further 30 minutes after aldehyde addition was complete. The crude product, which contained 0.148 equivalent of acid, was worked up as described in Example 1. Unchanged n-butyraldehyde (0.06 mole), unchanged styrene (0.31 mole), styrene oxide (0.11 mole) and unidentified neutral oxidation products were obtained. The conversions of styrene and n-butyraldehyde were 38% and 76% respectively. The molar yield of styrene oxide, both an olefine and aldehyde reacted, was 58%, while the molar yield of acid was 78%.

EXAMPLE 18

This example shows the use of a di-olefine, namely butadiene.

Butadiene (3.97 moles), ethyl acetate (600 grams) and cobalt naphthenate (2.0 grams) were charged to an aluminium-lined reactor which was maintained at 73–76° C., at a pressure of 400 lbs. per square inch gauge for two hours, during which time n-butyraldehyde (2.0 moles) was introduced. During the whole of this time, a gas mixture containing by volume 8% oxygen and 92% nitrogen was passed through the liquid at a rate of 850 litres per hour. The flow of gas was maintained for 17 minutes after the addition of aldehyde was complete. The product contained 1.02 equivalent of acid, unchanged butadiene (1.9 moles), butadiene monoxide (0.97 mole), butadiene dioxide (0.17 mole), unchanged n-butyraldehyde (0.17 mole) and unidentified oxidation products. Thus, the conversions of butadiene and n-butyraldehyde were 52% and 91.5% respectively. The total molar yields of epoxide on aldehyde and on olefine converted were 71.5% and 55% respectively, while the molar yield of acid on aldehyde converted was 56%.

The process described above was repeated except that 4.0 moles of aldehyde were employed. The amounts of butadiene monoxide and butadiene dioxide isolated from the product were 0.80 mole and 0.52 mole respectively.

This indicates that the n-butyraldehyde:butadiene ratio affects the monoxide:dioxide ratio in the product.

EXAMPLE 19

This example shows the use of a branched-chain aldehyde.

n-Octene-1 (0.5 mole) and iso-butyraldehyde (0.25 mole) were co-oxidised as described in Example 1, the reaction temperature being 65° C. and the duration of the reaction being two hours. The product contained 0.160 equivalent of acid, unchanged aldehyde (0.04 mole), unchanged n-octene-1 (0.39 mole), 1:2-epoxyoctane (0.09 mole) and unidentified oxidation products. Thus, the conversions of n-octene-1 and iso-butyraldehyde were 22% and 84% respectively. The epoxide yields on reacted olefine and aldehyde were 82% and 43% respectively, while the molar yield of acid on reacted aldehyde

EXAMPLE 20

The process described in the previous example was repeated except that the aldehyde was benzaldehyde (0.25 mole) and the temperature was 90° C. The product contained unchanged n-octene-1 (0.32 mole), 1:2 epoxyoctane (0.15 mole) and unidentified oxidation products. Thus, the n-octane-1 conversions was 36%, while the epoxide yields on olefine reacted and aldehyde charged were 83% and 60% respectively.

We claim:

1. In a process for the production of olefine oxides and carboxylic acids the step of continuously contacting an aldehyde selected from the group consisting of acetaldehyde, propionaldehyde, n-butyraldehyde, iso-butyraldehyde and benzaldehyde with an olefinic compound selected from the group consisting of mono-olefines having from 3 to 14 carbon atoms in which the double bond is a terminal double bond, and butadiene, at a temperature in the range of 40° to 150° C. and in a liquid phase with a gas containing molecular oxygen, said olefinic compound being present in amounts greater than said aldehyde at any given time in the process.

2. A process as claimed in claim 1 in which there is employed at least one initiator selected from the group consisting of hydrogen peroxide; alkyl hydroperoxides having the formula R—O—O—H where R is an alkyl group; dialkyl peroxides having the formula R—O—O—R, where R is an alkyl group; diacyl peroxides; dialkyl peroxy dicarbonates, peroxy esters and ultra-violet light.

3. A process as claimed in claim 1 conducted in the presence of a diluent selected from the group consisting of acetic acid, methyl acetate, ethyl acetate and acetone.

4. A process as claimed in claim 1 in which there is employed as initiator a salt of a metal of variable valency selected from the group consisting of copper, manganese, nickel and cobalt.

5. A process as claimed in claim 1 in which the temperature of operation is 60° to 90° C.

6. A process as claimed in claim 1 in which the olefine is fed continuously in the proximity of one end of a reactor tube and the aldehyde is introduced continuously at a succession of points along said reactor tube.

7. A process as claimed in claim 1 in which the amount of oxygen employed exceeds, on a molar basis, the amount of aldehyde.

8. In a process for the production of propylene oxide and acetic acid the step of continuously contacting propylene with acetaldehyde in a liquid phase with a gas containing molecular oxygen at a temperature in the range of 40–150° C. and in the presence of a salt of a metal selected from the group consisting of copper, manganese, nickel and cobalt, said propylene being present in amounts greater than said acetaldehyde at any given time in the process and the amount of oxygen exceeding, on a molar basis, the amount of acetaldehyde.

9. A process as claimed in claim 8 in which the propylene is fed continuously in the proximity of one end of a reactor tube and the acetaldehyde is introduced continuously at a succession of points along said reactor tube.

10. In a process for the production of olefine oxides and carboxylic acids, the step of contacting an aldehyde selected from the group consisting of acetaldehyde, propionaldehyde, n-butyraldehyde, iso-butyraldehyde and benzaldehyde with an olefinic compound selected from the group consisting of mono-olefines having from 3 to 14 carbon atoms in which the double bond is a terminal double bond, and butadiene, at a temperature in the range of 40° to 150° C. and in a liquid phase with a gas containing molecular oxygen, said process being carried out in a semi-continuous manner, the whole of the olefinic compound being fed initially and the aldehyde being added continuously and said olefinic compound being present in amounts greater than said aldehyde at any given time in the process.

11. A process for the production of an olefin oxide having at least three carbon atoms which comprises contacting a liquid mixture containing acetaldehyde and an olefin having at least three carbon atoms at a temperature of from 40°–150° C. with a gas containing molecular oxygen in the presence of a catalyst selected from the group consisting of a salt of copper and cobalt.

References Cited

UNITED STATES PATENTS

| 2,316,604 | 4/1943 | Loder et al. | 260—348.5 |
| 2,567,930 | 9/1951 | Findley et al. | 260—348.5 |
| 2,650,927 | 9/1953 | Gasson et al. | 260—348.5 |
| 2,754,325 | 7/1956 | Smith | 260—348.5 |
| 2,786,854 | 3/1957 | Smith et al. | 260—348.5 |
| 2,833,813 | 5/1958 | Wallace | 260—348.5 |
| 3,013,024 | 12/1961 | Payne | 260—348.5 |

FOREIGN PATENTS

| 820,461 | 9/1959 | Great Britain | 260—348.5 |

NORMA S. MILESTONE, *Primary Examiner.*